Aug. 2, 1927.

E. ARNOLD 1,637,980

PLANTER

Filed Aug. 17, 1925

Inventor

Edgar Arnold

By

Larry Lacey, Attorney

Aug. 2, 1927.  1,637,980
E. ARNOLD
PLANTER
Filed Aug. 17, 1925    4 Sheets-Sheet 2

Inventor
Edgar Arnold
By Lacey & Lacey, Attorney

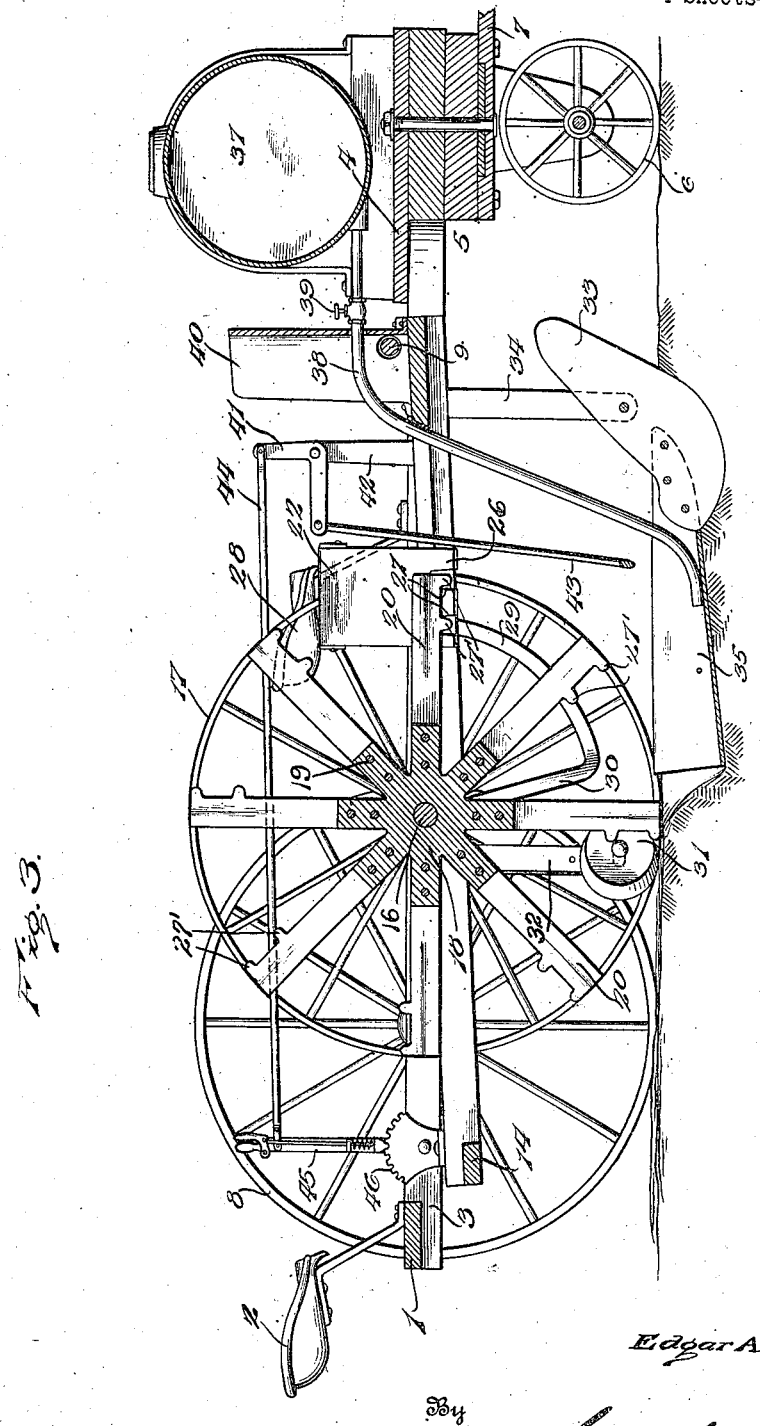

Aug. 2, 1927.  
E. ARNOLD  
PLANTER  
Filed Aug. 17, 1925
1,637,980
4 Sheets-Sheet 4
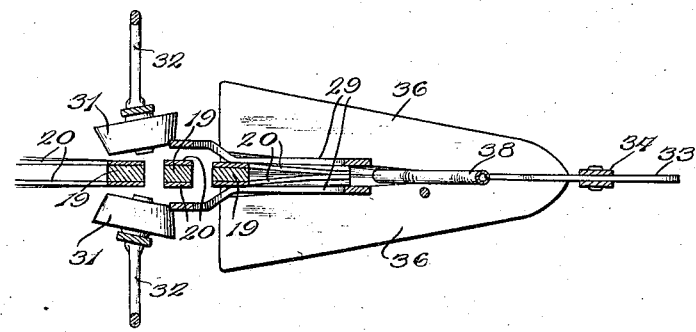
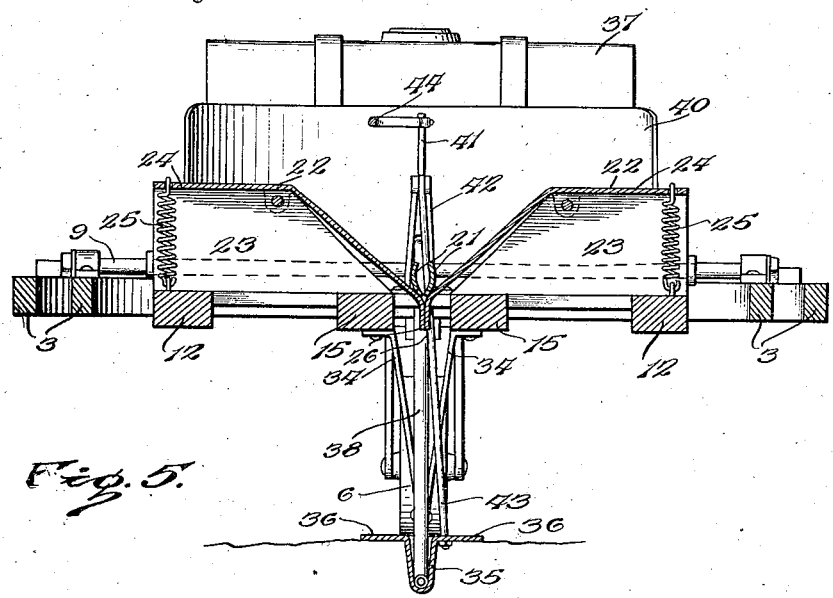
Inventor  
Edgar Arnold  
By Lacy & Lacey, Attorneys Patented Aug. 2, 1927.

1,637,980

UNITED STATES PATENT OFFICE.

EDGAR ARNOLD, OF KENT, OHIO.

PLANTER.

Application filed August 17, 1925. Serial No. 50,730.

This invention is a machine for setting out young plants and the object is to provide a machine which will automatically take the plants from a holding element and set them in the ground and then compress the earth around the roots as the machine is drawn forward over a field. The invention seeks to provide a machine by the use of which a narrow furrow will be formed to receive the plants and water supplied to the furrow as the plants are set therein, means being provided to prevent the furrow being closed by the surrounding earth until after the plant has been set. The invention also seeks to provide a machine which will set the plants at any desired distance apart and which will automatically accommodate itself to unevenness in the surface of the ground so that the plants will be set at a uniform depth. The invention is illustrated in the accompanying drawings and will be hereinafter first fully described and then more particularly pointed out in the appended claims.

In the drawings:

Fig. 3 is a central vertical longitudinal section;

Fig. 4 is a horizontal section on the line 4—4 of Fig. 2, and

Fig. 5 is a transverse section on the line 5—5 of Fig. 2.

Figure 1:
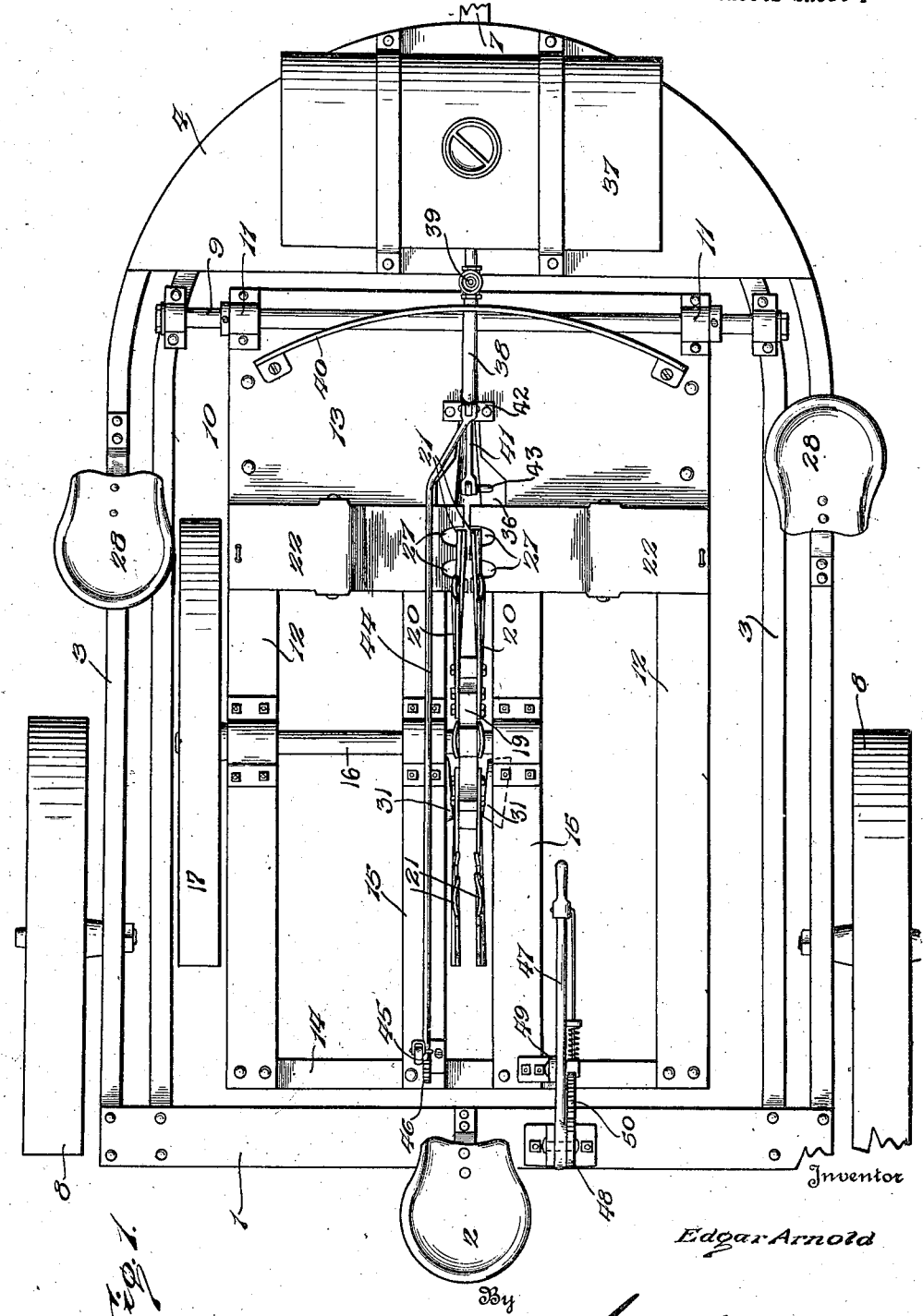
Figure 1 is a plan view showing one embodiment of the invention.
Figure 2:
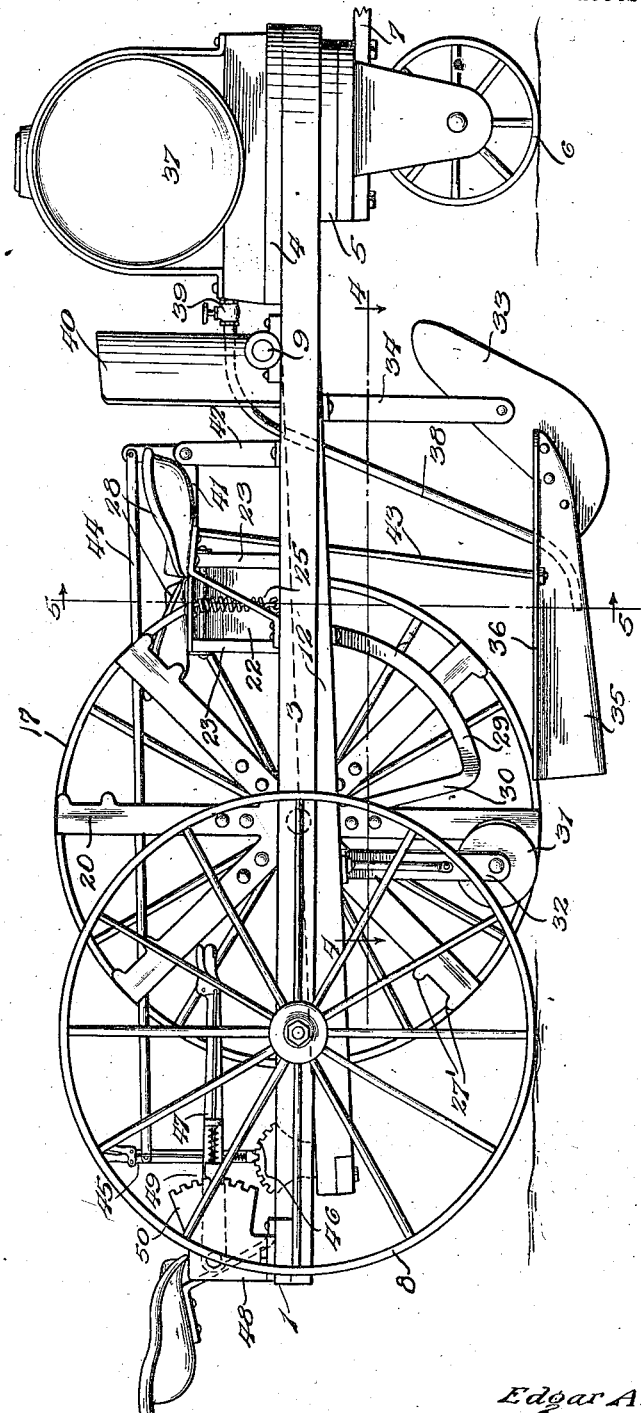
Fig. 2 is a side elevation of the same.

In carrying out the invention, I employ a main supporting frame which consists essentially of a cross bar 1 carrying a seat 2 for the driver and side bars 3 secured to and extending forwardly from the said cross bar, the forward ends of said side bars being preferably curved toward each other and secured to and supporting a platform 4. On the under side of the frame at the front end thereof is a fifth wheel 5 carrying a front wheel or roller 6, and any preferred form of draft device, indicated at 7, may be connected with the fifth wheel so that the machine may be drawn over a field along the row which is to be planted. Ground wheels 8 are mounted upon the side bars 3 adjacent the rear ends thereof so that the main frame will be supported by the ground and may easily travel thereover. Adjacent the rear edge of the platform 4, a pivot rod 9 is secured on the main frame and a supplemental frame, indicated as an entirety by the reference numeral 10, is provided at its front end with bearings 11 encircling the said pivot rod so that the supplemental frame may swing to a limited extent about the same. The supplemental frame consists of side bars 12 connected at their front ends by a table 13 carrying the bearings 11 and connected at their rear ends by a cross bar 14. Intermediate longitudinal bars 15 extend between the cross bar 14 and the table 13 and are arranged adjacent but at opposite sides of the central longitudinal line of the machine. A driving shaft 16 is mounted in suitable bearings upon the cross bars 15 and one side bar 12 and projects at one end beyond the said side bar so as to carry a driving wheel 17 between the said side bar and the side of the main frame whereby, as the machine is drawn forward, the wheel 17 through its contact with the ground will rotate the shaft 16 and the plant carrier which is mounted upon said shaft between the longitudinal frame bars 15. The plant carrier comprises a central hub member 18 having short radial arms 19 projecting therefrom and to the ends of these arms 19 are secured the plant-engaging fingers 20. These plant-engaging fingers are formed of metal and are resilient so that the outer free ends of cooperating fingers are normally spaced slightly apart. As shown in Figs. 1 and 2, the plant-engaging fingers 20 are provided in pairs, the members of each pair being secured to opposite sides of one arm 19 and, at their free ends, said fingers are slightly bowed or dished in cross section, as shown most clearly at 21 in Fig. 5. The hub member 18 is secured firmly to the shaft 16 so that it will rotate therewith when the latter is rotated through the action of the ground-engaging wheel 17, and in advance of said shaft I provide means for temporarily supporting a plant in position to be engaged by the fingers as they move downwardly. The plant-supporting and holding means consists of a pair of doors 22 pivoted between their ends at the upper edges of vertically disposed transverse supporting plates 23 secured upon the supplemental frame immediately adjacent the rear edge of the table 13. These doors are preferably given the form shown most clearly in Fig. 5 whereby they have an upper outer flat portion 24 which normally rests horizontally upon the upper edges of the supporting plates 23 and is yieldably held in that position by a contractile spring 25 secured at its upper end to the door adjacent the outer edge thereof and at its lower end to one of the side bars 12 of the supplemental frame. The inner portion of each door is extended obliquely downwardly and inwardly so that the lower ends thereof normally meet at the center of the machine between the intermediate bars 15 and in spaced relation to the said bars, the extremities of the doors being turned downwardly to form abutting stop lips 26. Immediately above and at the said stop lips 26, openings 27 are formed in the doors to accommodate spurs 27' formed on the edges of the plant-engaging fingers 20 whereby the fingers will be brought into position to engage around the plant before separating the doors to permit the plant to pass between them.

The young plants are placed upon the table 13 and operators ride upon the main frame in seats 28 provided therefor on the side bars 3 so that the said operators may conveniently reach the plants and transfer them manually singly from the table to a position between the inner downwardly extending portions of the doors. A plant is placed in the bight presented by the doors with the roots extending forwardly, as will be understood upon reference to Fig. 1, and as the machine travels a pair of fingers will be caused to ride downwardly between the doors and by their engagement with the said inclined inner portions of the doors will be caused to engage around the plant so as to support it without crushing it and then, as the movement continues, the fingers will pass down between the stop lips 26 and force them apart so that the plant and the fingers carrying it may pass downwardly to set the plant in the ground. In order that the fingers may be held in engagement with the plant until the setting point is reached, guide rails 29 are provided on the under side of the supplemental frame, and these guide rails consist of flat-sided arcuate bars secured at their forward ends to the under side of the bars 15 immediately below the doors 22 and at such distance apart that the plant-engaging fingers will be held together closely enough to avoid releasing the plant prematurely. These bars are of arcuate form, as shown most clearly in Fig. 2, and have straight portions 30 which are secured to the under sides of the bars 15 adjacent the shaft 16 and in advance of the same whereby the rear ends of the arcuate portions of the guides will be held against spreading and the proper support for the plant-carrying fingers will be provided. The plant-engaging fingers will not clear the guides until they are approximately in a vertical position at which time the plant will have been entered in the furrow provided therefor, whereupon the resiliency of the fingers will cause them to spread apart sufficiently to release the plant. In order that the soil may be pressed firmly about the roots of the plant, I provide packer wheels or rollers 31 which are located at opposite sides of the path of travel of the fingers and are adapted to ride upon the ground at the opposite sides of the plant. These rollers are frustums of cones and are set somewhat obliquely so that they will properly engage the surface soil and press the same inwardly about the plant to support the same and enable it to take root. The rollers are carried by the lower ends of brackets or hangers 32 of any approved form secured to the under sides of the bars 15 and depending therefrom, as will be readily understood.

Carried by the front end of the supplemental frame is a furrow-forming device consisting of a plow or furrow opening blade 33 which is suspended from the frame by a rigid hanger 34 and preferably consists of a thin plate presenting its edge to the ground, as will be understood upon reference to Figs. 2 and 4. To the rear end portion of this furrow-opening member is a furrow-shaping plow consisting of a substantially U or V-shaped plate 35 having lateral wings 36 extending from its edges to ride upon the ground and press the soil sufficiently to prevent the walls of the furrow collapsing. These wings will run approximately horizontal, their front ends being raised from the ground just enough to prevent dragging dirt into the furrow, and it will be readily understood that the furrow-shaping member 35 will run below the surface, following the furrow opener, and will pack the soil at the sides of the furrow sufficiently to prevent collapse thereof after the plow has passed. The furrow-shaping plow is of such length that its rear end is located just in advance of the packing rollers 31 so that the plant to be set will be carried through the trough presented by the furrow shaper and consequently enter the furrow without breaking down the walls of the same. The operation is so timed that the plant will be released just after it clears the rear end of the furrow shaper and the packing rollers 31 will then at once ride upon the surface soil immediately at the sides of the plant and will compress the soil about the plant. A tank 37 is mounted upon the platform 4 and a hose 38 leads from the tank into the trough of the furrow shaper, as clearly shown, so as to supply water to the furrow, thereby aiding in the packing of the loose soil about the roots and also furnishing immediate nourishment for the roots. A cut-off valve 39 is provided in the hose adjacent the tank so that the flow of the water may be easily controlled. Erected upon the table 13 immediately in rear of the platform 4 and the tank thereon is a windshield 40 which may be of any approved construction and serves to effectually prevent the plants being blown from the table 13 by hard winds or by the natural draft created by the travel of the machine.

To set the furrow-forming elements so as to run at any desired depth, I provide an angle lever 41 which is fulcrumed at its angle upon a post 42 erected upon the table 13 at the center thereof, and to the rear end of its lower arm is pivoted a connecting rod 43 which has its lower end secured in one wing 36 of the furrow shaper. A link 44 is pivoted at its front end to the end of the upstanding arm of the angle lever and extends therefrom to the rear of the machine where it is attached to a hand lever 45 fulcrumed upon the rear end of the supplemental frame and provided with a latch cooperating with a rack 46 on said frame whereby the lever may be held in a set position. The supplemental frame may also be adjusted so that the plant-engaging fingers will enter the soil to a desired depth by a hand lever 47 which is fulcrumed at its rear end to a post or bracket 48, secured on the rear cross bar 1 of the main frame, and projects therefrom over the supplemental frame, a post 49 being secured upon the rear end of the supplemental frame, as shown in Fig. 1, and being pivotally connected at its upper end to the lever 47. The bracket 48 carries or has formed thereon a rack 50 cooperating with a latch on the lever 47 in the usual manner to hold the lever and the supplemental frame in the position in which they may be set.

It is thought the operation and advantages of the machine will be readily understood from the foregoing description, taken in connection with the accompanying drawings. The main frame is carried by the wheels 6 and 8, and the driving wheel 17, which is mounted upon the supplemental frame, also travels upon the ground and receives motion through traction. The machine will follow the unevennesses in the surface of the ground and the pivotal mounting of the supplemental frame will permit to a limited extent additional accommodation of the supplemental frame to the unevennesses so that the plants will be set at a uniform depth, it being understood that, if desired, the pivotal connection between the hand lever 47 and the post or bracket 49 may provide for a slight lost motion. As the machine goes forward, the furrow-forming elements will open the ground and shape a narrow furrow therein to receive the plants and the plant-engaging fingers will successively enter between the doors 22 and clasp a plant placed thereon and then carry it into the furrow, as has been previously set forth. The water from the tank 37 will be delivered within the V-shaped central portion of the furrow shaper and will, consequently, be concentrated about the roots of the plant and will be prevented from spreading over the surface of the ground. The plant-engaging fingers are removably secured to the radial arms 19 and, consequently, by removing certain of the plant-engaging fingers the plants may be set at any desired distance apart. The machine is compact and is free of complicated structure so that it is not apt to get out of order and will operate efficiently without requiring constant repairs or readjustment.

Having thus described the invention, I claim:

1. A plant-setting machine comprising a supporting frame, a pair of transversely alined plant-holding members having downwardly converging portions terminating in abutting stop lips and provided with openings therethrough at said lips, means for yieldably holding the opposed converging portions of said members in contact whereby to support a plant, and a plurality of pairs of normally open plant-clasping fingers arranged to ride upon and between said plant-holding members to engage the plant and remove the same, said fingers being provided with forwardly projecting spurs to enter the openings in the plant-holding members whereby to avoid dislodgment of the plant prior to its clasping by the fingers.

2. A plant-setting machine comprising a supporting frame, a pair of transversely alined plant-supporting members mounted on the frame and having their inner end portions inclined downwardly and inwardly, yieldable means for holding said inner end portions of the plant-supporting members together to support a plant, a plurality of pairs of normally open plant-clasping fingers arranged to ride upon and between said inner end portions of the plant-supporting members to engage a plant and remove the same, and means below said members to hold the fingers closed until the plant reaches the ground.

In testimony whereof I affix my signature.

EDGAR ARNOLD. [L. S.]